(12) United States Patent
Gardner

(10) Patent No.: US 8,599,104 B2
(45) Date of Patent: Dec. 3, 2013

(54) MODULAR LIGHTING AND VIDEO APPARATUS

(75) Inventor: Brett Aric Gardner, Chicago, IL (US)

(73) Assignee: RGB Lights Inc., Lincolnwood, IL (US)

( * ) Notice: Subject to any disclaimer, the term of this patent is extended or adjusted under 35 U.S.C. 154(b) by 1150 days.

(21) Appl. No.: 12/288,696

(22) Filed: Oct. 22, 2008

(65) Prior Publication Data

US 2009/0146910 A1  Jun. 11, 2009

Related U.S. Application Data

(60) Provisional application No. 60/987,522, filed on Nov. 13, 2007.

(51) Int. Cl.
*G09G 5/00* (2006.01)

(52) U.S. Cl.
USPC .............. 345/1.3; 345/1.1; 345/1.2; 362/231; 362/249

(58) Field of Classification Search
None
See application file for complete search history.

(56) References Cited

U.S. PATENT DOCUMENTS

| | | |
|---|---|---|
| 3,591,942 A | 7/1971 | Van Swearingen |
| 3,758,972 A | 9/1973 | Egermayer |
| 4,782,336 A | 11/1988 | Bailey |
| 4,970,812 A | 11/1990 | Tanaka et al. |
| 5,027,258 A | 6/1991 | Schoniger et al. |
| 5,036,248 A | 7/1991 | McEwan et al. |
| 5,268,828 A | 12/1993 | Miura |
| 5,361,190 A | 11/1994 | Roberts et al. |
| 5,450,301 A | 9/1995 | Waltz et al. |
| 5,469,020 A | 11/1995 | Herrick |
| 5,532,711 A | 7/1996 | Harris |
| 5,575,098 A | 11/1996 | Goettel-Schwartz |
| 5,601,361 A | 2/1997 | Lawrence |
| 5,612,741 A | 3/1997 | Loban et al. |
| 5,638,084 A | 6/1997 | Kalt |
| 5,678,335 A | 10/1997 | Gomi et al. |
| 5,775,802 A * | 7/1998 | Kuo ............................... 362/396 |
| 5,836,676 A | 11/1998 | Ando et al. |
| 5,900,813 A | 5/1999 | Ruminski et al. |
| 5,900,850 A | 5/1999 | Bailey et al. |
| 5,946,646 A | 8/1999 | Schena et al. |
| 6,000,812 A | 12/1999 | Freeman et al. |
| 6,101,750 A | 8/2000 | Blesener et al. |

(Continued)

OTHER PUBLICATIONS

International Preliminary Examination Report dated Oct. 28, 2010 in corresponding application (PCT/US08/12723).

(Continued)

*Primary Examiner* — Srilakshmi K Kumar
*Assistant Examiner* — Jesus Hernandez
(74) *Attorney, Agent, or Firm* — Nields, Lemack & Frame, LLC

(57) ABSTRACT

Modular flexible panels for mounting lighting strands. In certain embodiments, each individual panel is an integral unit comprised of cables and node holders that combine to create a flexible, scalable and modular lighting surface. One or more of the panel edges can connect to an edge of another panel (either directly or indirectly) to tile multiple panels together to form a modular multi-panel assembly. Each panel provides a surface to which strands of LEDs can be mounted, such as in a uniform pattern. The panel design allows for easy replacement and serviceability of individual lighting strands, and ensures that all of the LEDs face in the same direction. The resulting robust and flexible system can provide full-motion video, graphics and messaging in a transparent single or multi-panel design.

9 Claims, 17 Drawing Sheets

(56) References Cited

U.S. PATENT DOCUMENTS

| | | |
|---|---|---|
| 6,262,698 B1 | 7/2001 | Blum |
| 6,271,814 B1 | 8/2001 | Kaoh |
| 6,367,951 B1 | 4/2002 | Kumada et al. |
| 6,567,010 B1 | 5/2003 | Lin et al. |
| 6,737,983 B1 | 5/2004 | Temple |
| 7,319,408 B2 | 1/2008 | Temple |
| 7,354,180 B2 | 4/2008 | Sawhney et al. |
| 2002/0024809 A1 | 2/2002 | Openiano |
| 2003/0117347 A1 | 6/2003 | Hunter et al. |
| 2003/0117348 A1 | 6/2003 | Knapp et al. |
| 2005/0178034 A1* | 8/2005 | Schubert et al. ................ 40/605 |
| 2005/0237273 A1 | 10/2005 | Ozawa et al. |
| 2006/0039142 A1* | 2/2006 | Temple .......................... 362/231 |
| 2006/0050032 A1 | 3/2006 | Gunner et al. |
| 2006/0197474 A1 | 9/2006 | Olsen ............................ 315/312 |
| 2006/0215398 A1* | 9/2006 | Farmer et al. ................. 362/227 |
| 2007/0217200 A1 | 9/2007 | Yang et al. .................... 362/277 |

OTHER PUBLICATIONS

Philips—Color Kinetics; icolor Flex SLX article.

The International Search Report and Written Opinion dated Jan. 16, 2009.

Canadian Communication dated Feb. 3, 2012 in corresponding Canadian Patent Application No. 2,706,240.

* cited by examiner

MODULAR LIGHTING AND VIDEO APPARATUS

This application claims priority of Provisional Application Ser. No. 60/987,522, filed on Nov. 13, 2007, the disclosure of which is hereby incorporated by reference.

BACKGROUND

Disclosed herein are illuminating systems and devices, such as light emitting diode devices. More particularly, various embodiments relate to indoor/outdoor illumination systems and devices in modular form capable of providing flexible lighting displays.

Conventional lighting systems have been used to provide customized lighting effects, such as color-changing LED lighting systems. Some such systems are arranged in network configurations and generate coordinated lighting effects. They are typically used in various venues, including concerts, meetings, exhibitions, theater, etc.

However, conventional systems are difficult to transport, erect and service. LED lighting strands are available, but lack structure or a surface for providing them in a flexible, modular and scalable format. It therefore would be desirable to provide a flexible, lightweight and scalable lighting assembly that is easily serviceable, such as by allowing for single strand replacement.

SUMMARY

The embodiments disclosed herein relate generally to lighting systems and methods. In certain embodiments, two or more lighting elements are arranged to form a lighting system. In one aspect of this embodiment, each lighting element includes a group of LEDs (light-emitting diodes) arranged on one or more flexible panels so as to be capable of forming various shapes. In certain embodiments, the panels are scalable and modular. In certain embodiments, each lighting element may include elements to generate the same color light, and/or elements to generate light of different colors. Two or more elements of the system may be configured as addressable lighting elements to facilitate coordination of the elements as a networked lighting system. The result of the foregoing is the ability to deploy large format video through lights in a wide variety of applications.

More specifically, commercially available lighting strands, such as iColor Flex stands available from Color Kinetics, which are arrays of nodes (each node comprising, for example, an LED emitting radiation of various spectrums, such as a red/green/blue tri-color LED and a control chip), or strands available from Colourweb, are mounted on flexible members at predetermined spacing to form a modular and scalable lighting surface or panel. In certain embodiments, each individual panel is an integral unit comprised of cables and node holders that combine to create a flexible, scalable and modular lighting surface that can, for example, wrap around existing structures to conform to the shape of the existing structure in three dimensions, can hang flush against existing structure horizontally or vertically, can hang freely, or can be draped or scalloped. In certain embodiments, one or more of the panel edges connects to an edge of another panel (either directly or indirectly) to tile multiple panels together to form a modular multi-panel assembly. Each panel provides a surface to which strands of LEDs can be mounted, such as in a uniform pattern, or to which individual lighting elements or sources can be mounted. The panel design allows for easy replacement and serviceability of individual lighting strands or elements, and ensures that all of the elements face in the same direction. In certain embodiments, the lighting elements are arranged in interconnecting linear arrays on the panel. The resulting robust and flexible system can provide full-motion video, graphics, color light shows and messaging in a transparent single or multi-panel design.

DETAILED DESCRIPTION

Figure 1:
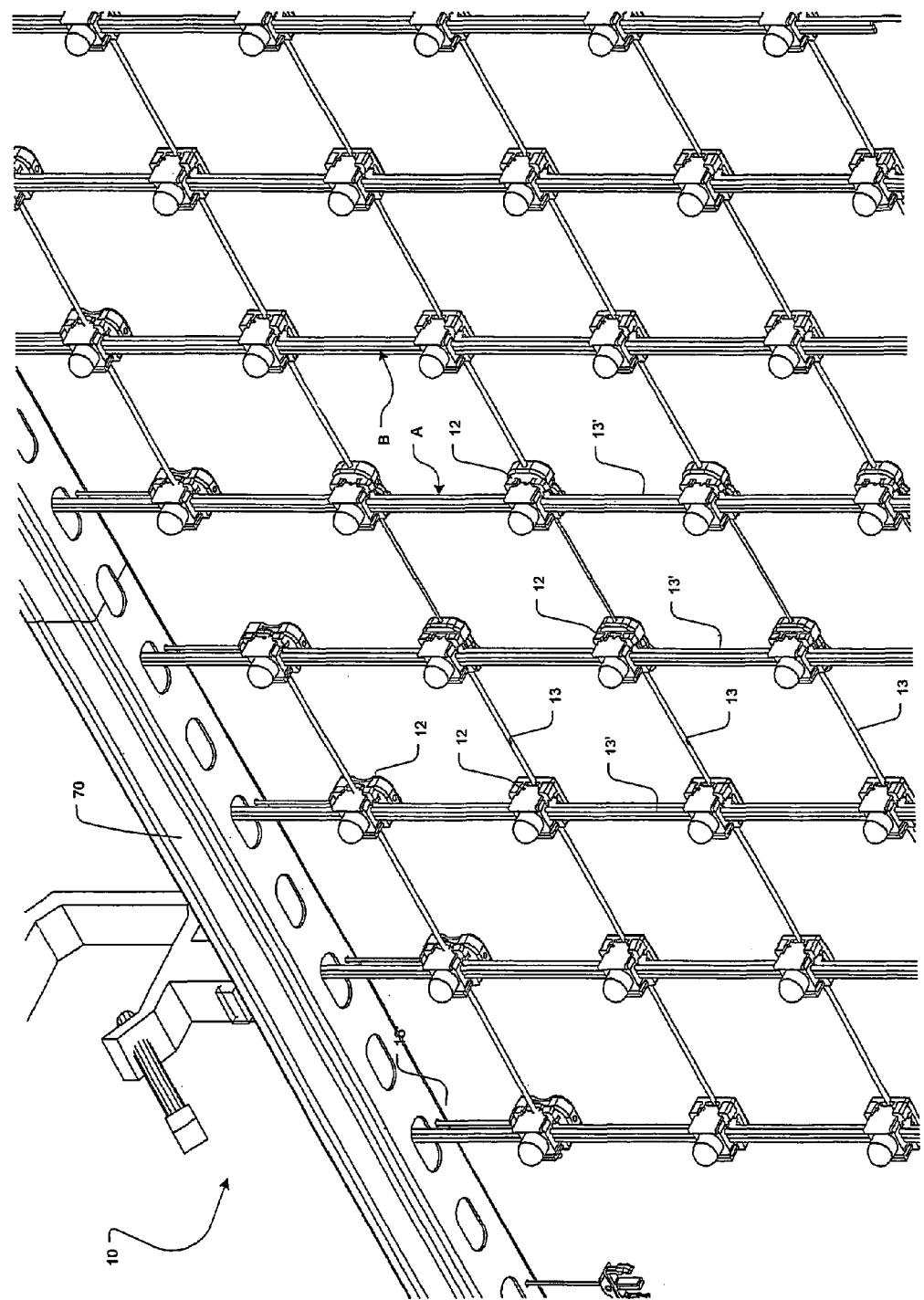
FIG. 1 is a partial perspective view of a lighting panel in accordance with certain embodiments.

FIG. 1 illustrates a portion of a panel 10 in accordance with certain embodiments. The panel 10 includes a plurality of node holders 12, preferably positioned in a symmetrical array to form a grid pattern as shown. Each node holder 12 is joined to an adjacent node holder by a flexible string, wire rope or cable 13, 13'. Alternative configurations are within the scope of the disclosure; equal spacing between node holders in any given row or column is not necessary, although preferably the nodes 12 are equally spaced from each other, both in the longitudinal and horizontal directions. Preferably the cable 13, 13' is aircraft cable formed of multiple strands of wires, which optionally can be covered in a plastic sheath. Preferably the node holders interconnect to form linear arrays of node holders.

Figure 2:
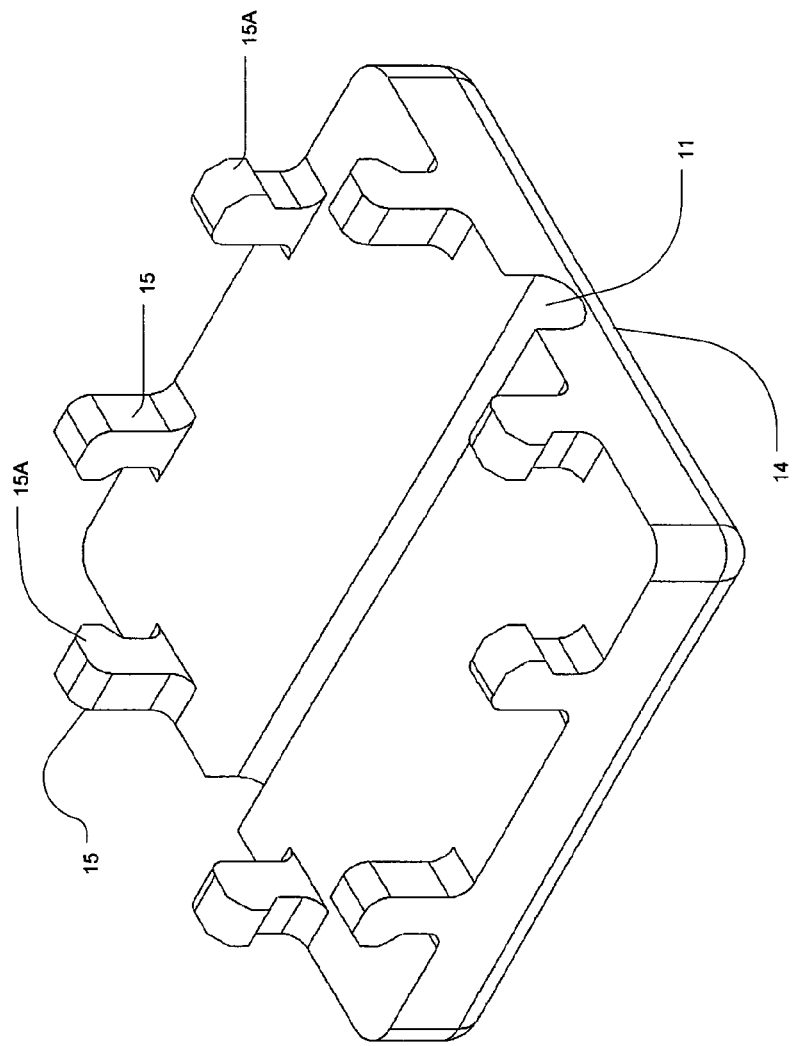
FIG. 2 is a perspective view of a bottom portion of a node holder in accordance with certain embodiments.

Each node holder 12 includes a bottom portion 14 as shown in FIG. 2. The bottom portion 14 is preferably made of plastic, such as a polyolefin, particularly polypropylene, polycarbonate, or acetyl polyoxomethylene (POM). and includes a flat bottom surface. The top surface includes a plurality of projecting members 15, preferably spaced about the perimeter, which receive the top portion 16 of the node holder 12 (FIG. 3), such as by a snapping fit. The top surface of the bottom portion 14 also includes an arcuate groove 11 shaped and of sufficient depth to receive the cable 13 (see FIG. 4) when in the assembled condition. The groove 11 can be formed in the bottom portion 14 by routing.

Figure 3:
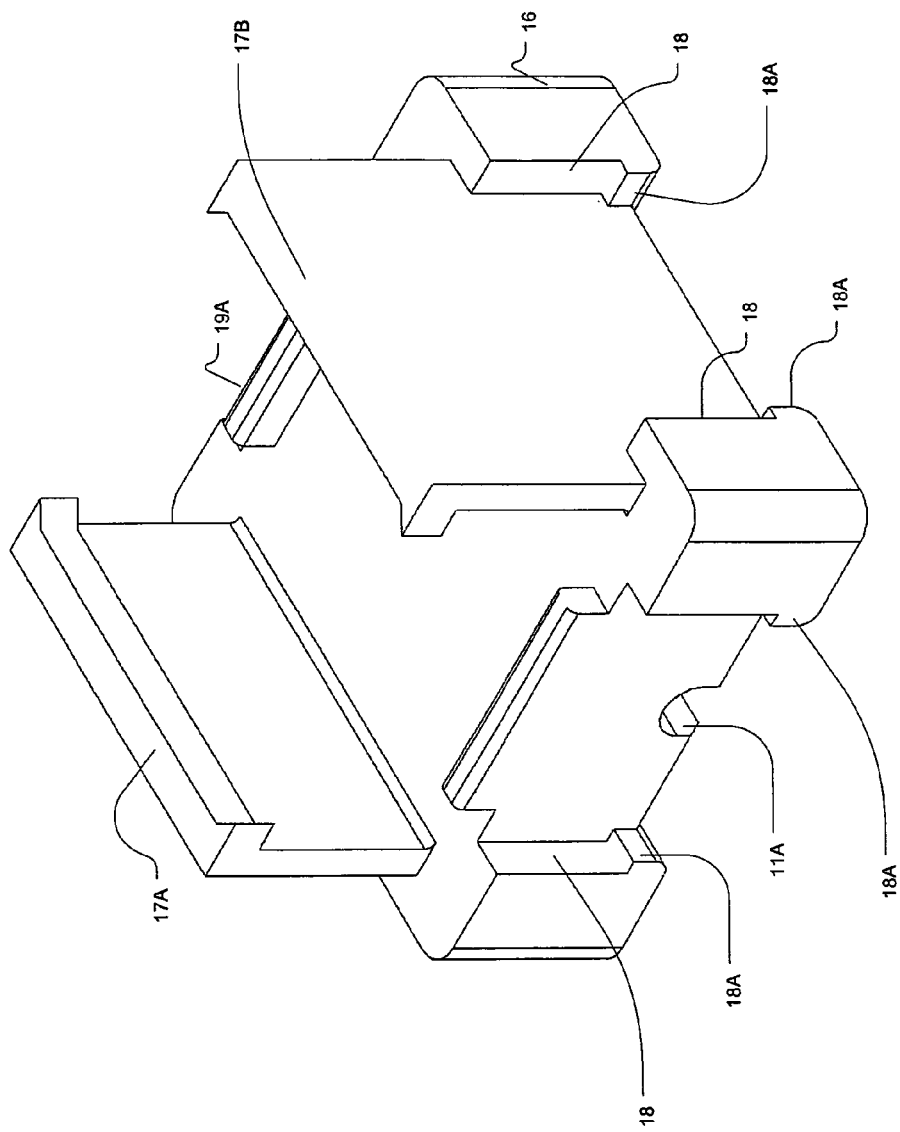
FIG. 3 is a perspective view of a top portion of a node holder in accordance with certain embodiments.
Figure 4:
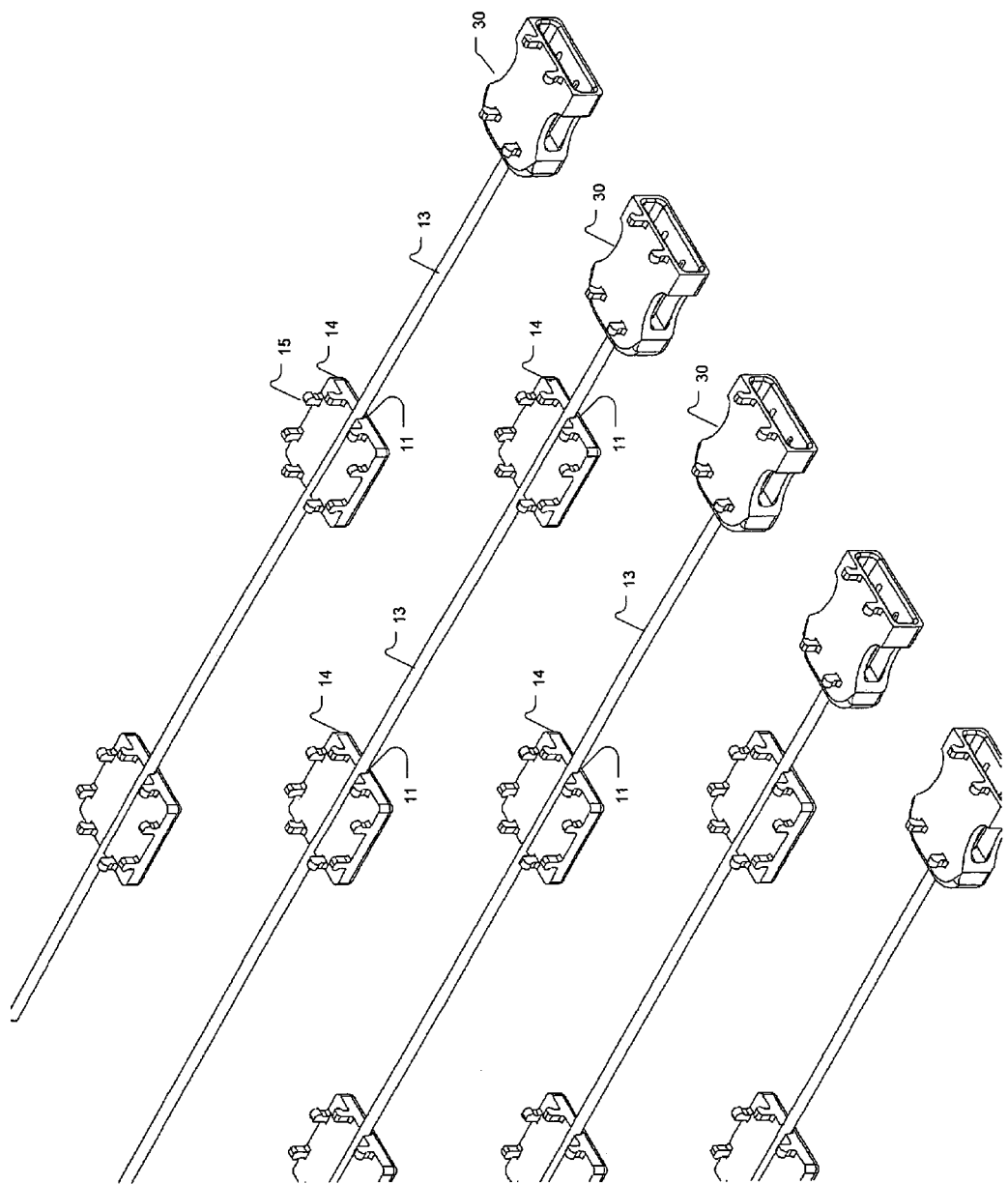
FIG. 4 is a perspective view of a portion of a node holder shown holding with a cable, the cable terminating with a buckle, in a partially assembled condition in accordance with certain embodiments.

Turning now to FIG. 3, the top portion 16 of the node holder 12 is configured to be received by the bottom portion 14 to form an integral unit. The top portion 16 is also preferably made of plastic, such as a polyolefin, particularly polypropylene, or polycarbonate. The bottom surface of the top portion 16 includes an arcuate groove 11A, shaped and of sufficient depth to receive the cable 13' when in the assembled condition. The groove 11A in the top portion 16 is positioned such that it runs perpendicularly with respect to the groove 11 in the bottom portion 14 when the top portion 16 and bottom portion 14 are adjoined in the assembled condition, such that both longitudinally running cables 13 and horizontally running cables 13' can be received by the node, one above the other. The groove 11A can be formed in the top portion 16 during an injection molding process or by routing. Preferably the top and bottom portions of the node holder 12 are assembled together, about the cables 13, 13' properly positioned in the grooves 11, 11A, and can optionally be adhered together such as with glue. More specifically, each projection 15 on the bottom portion 14 receives a shoulder 18A of wall 18 of the top portion, with the flange 15A of each projection 15 extending over the shoulder 18A. The projections 15 and shoulders 18A thus cooperate to form an integral node holder unit.

The top portion 16 also includes two oppositely facing side walls 17A, 17B projecting upwardly to define between them a space configured to removably receive an LED node or other illuminating device, as described below. Preferably each of the side walls 17A, 17B includes a top flange portion that extends inwardly towards the other. Opposite shorter walls 19A, 19B provide further stability to the LED node or illuminating device when mounted thereto.

Figure 5:
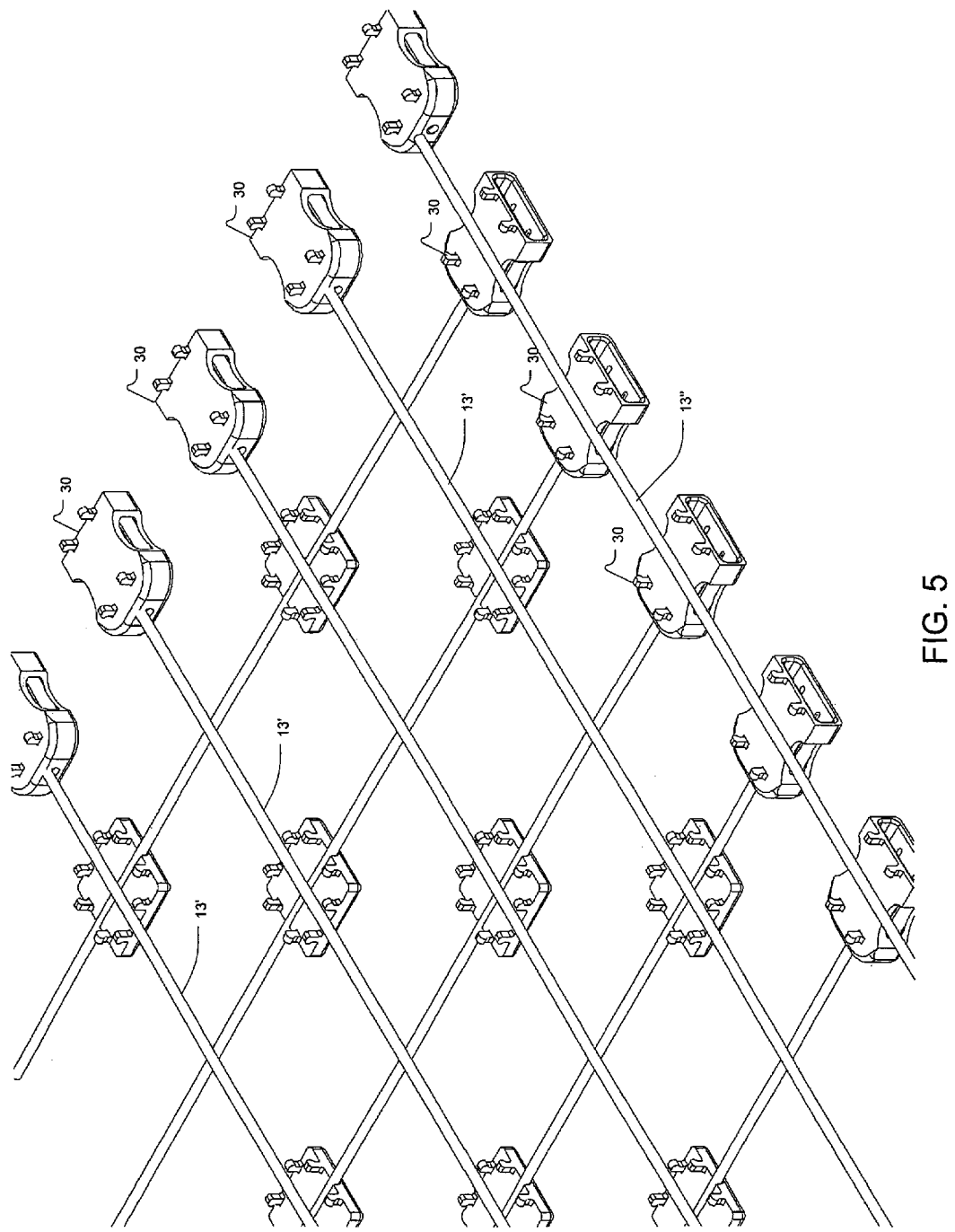
FIG. 5 is a perspective view of a portion of a node holder shown holding cable, the cable terminating in a buckle, in a partially assembled condition in accordance with certain embodiments.
Figure 6:
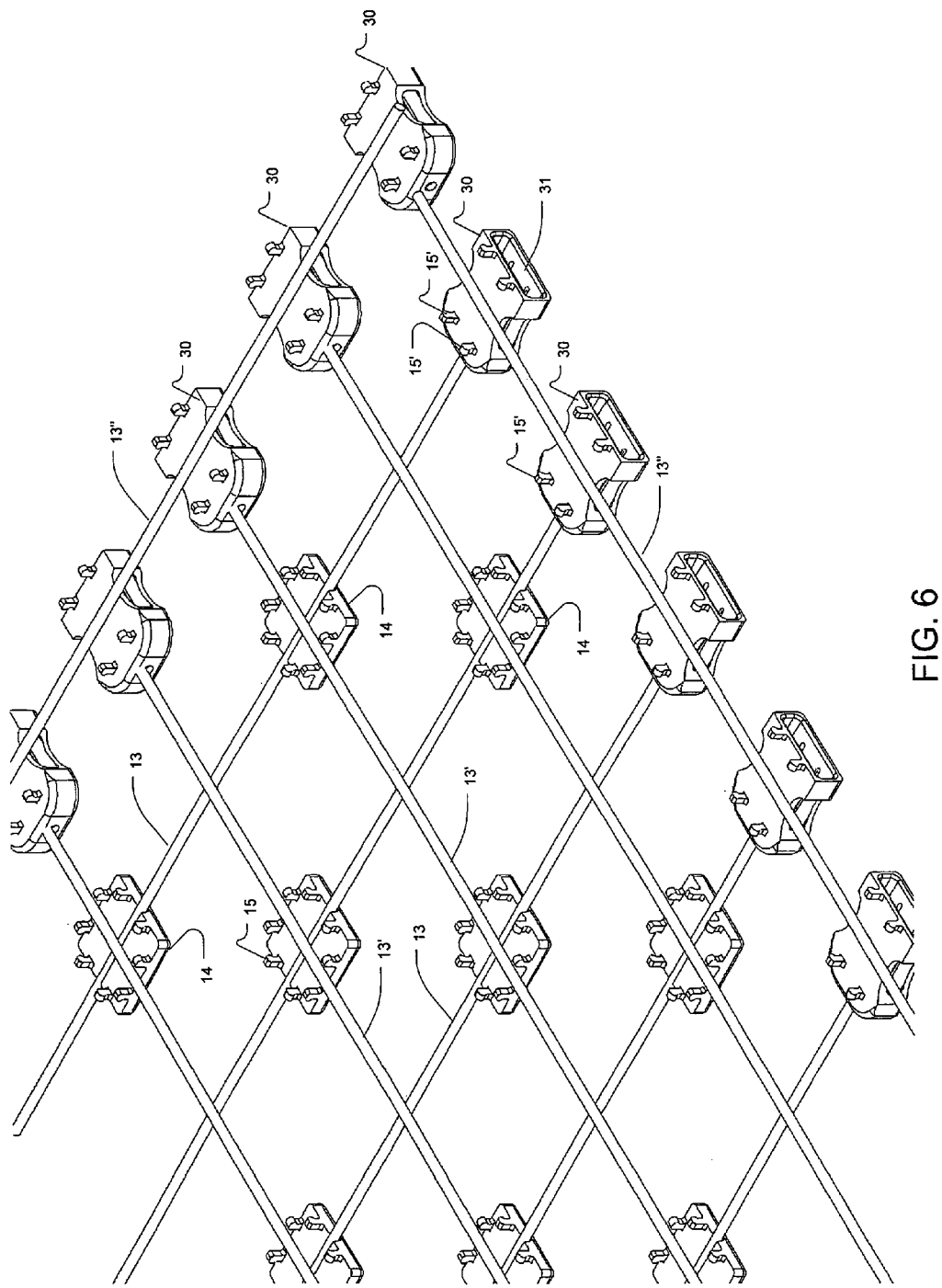
FIG. 6 is a perspective view of a portion of a node holder shown holding cable, the cable terminating in a buckle, in a partially assembled condition in accordance with certain embodiments.
Figure 7:
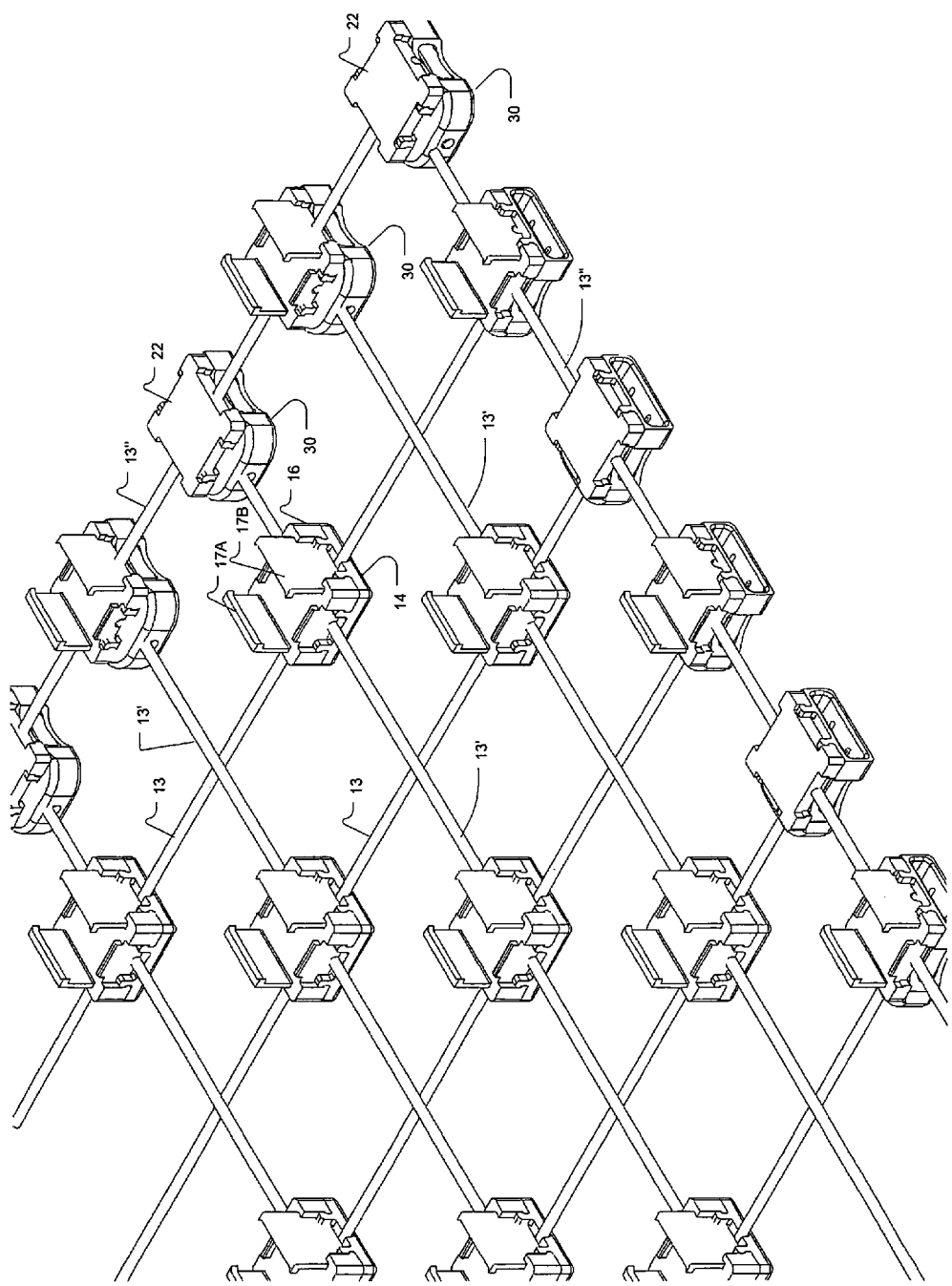
FIG. 7 is a perspective view of a node holder shown holding cable, the cable terminating in a buckle, in an assembled condition in accordance with certain embodiments.

FIGS. 4 through 7 illustrate one method of constructing the panel 10 comprised of node holders 12. The bottom portions 14 are positioned as desired, and cables 13 are aligned in rows and positioned in the grooves 11 to form a plurality of columns as shown. Next, as shown in FIG. 5, cables 13' are placed over and transversely across cables 13 to form a plurality of rows. An end cables 13" also can be placed across buckles 30 as shown in FIG. 6. Then, as shown in FIG. 7, the top portion 16 of the node holder 12 is adjoined to the bottom portion 14, to secure both the longitudinal cables 13 and the transverse cables 13' in place, as well as to secure the end cables 13". An adhesive can be used to secure the node holder.

Figure 8:
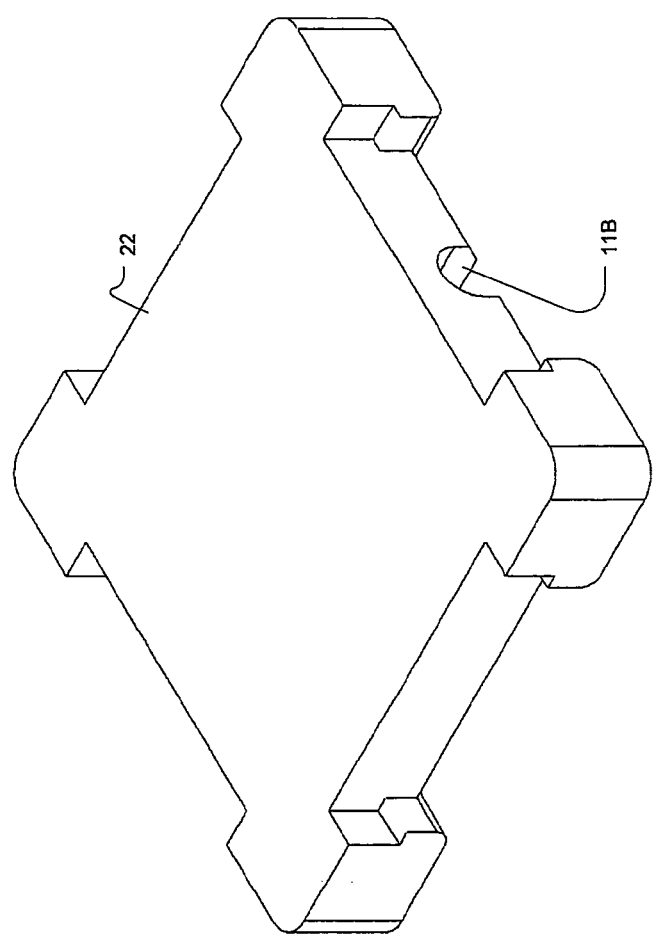
FIG. 8 is a perspective view of a cable holder in accordance with certain embodiments.

FIG. 8 illustrates a cable holder 22 that is used to hold end cable 13" in place along panel edges where nodes are not used, such as at every other space between nodes as shown in FIG. 7. The cable holder 22 includes an arcuate groove 11B of sufficient shape and depth to receive cable 13", and is preferably secured to buckle 20 such as by gluing. The buckles 30 also can have projections 15', similar to projections 15 on the bottom portions 14, to assist in securing the cable holders 22.

Figure 9:
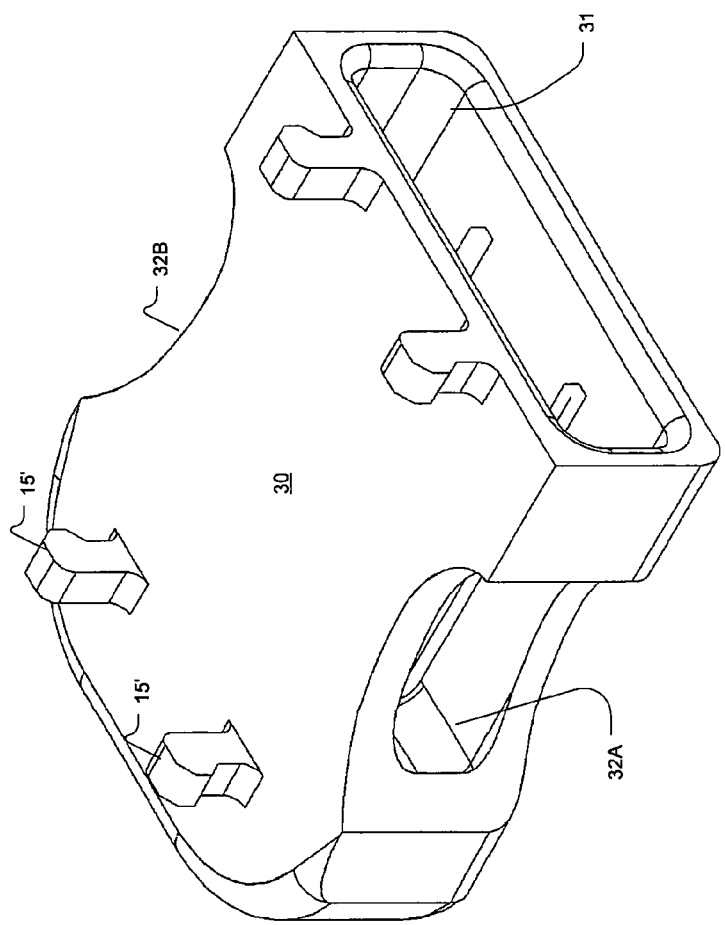
FIG. 9 is a perspective view of a female buckle in accordance with certain embodiments.

As can be seen in FIGS. 4-7, the ends of cable 13 and 13' are affixed to female buckles 30 which define a panel edge and to allow for expansion of the panel, i.e., to create a modular design. Although side release buckles are shown, those skilled in the art will appreciate that any suitable buckle, latch, clip or other mechanism can be used to adjoin the edge of one panel to the edge of another panel, either directly or via an intermediate attachment mechanism (e.g., one that itself attaches, as a bridge or jumper, to edges of first and second panels). Each buckle 30 can have an aperture (not shown) in which the cable 13 or 13' is inserted and secured within the buckle, such as by crimping at or near the end of a cable a metal cylinder 71 or the like that acts as a wedging stop when inserted into the aperture (see FIGS. 10A and 12), and can be further secured therein by gluing. The stop ensures that the buckles do not slide along the cable. Other means to secure the cable to the buckle are within the scope of the present disclosure. A suitable female buckle 30 is illustrated in detail in FIG. 9. The top surface of each buckle 30 preferably includes the spaced upwardly extending projections 15', which are similar to projections 15 on node holder portion 14. The projections 15' are spaced and configured to hold a node holder 12 or cable holder 22 in snapping relation with the buckle 30, as seen in FIG. 7. Although four such projections 15' are shown, the disclosure is not limited to any particular number.

Figure 10:
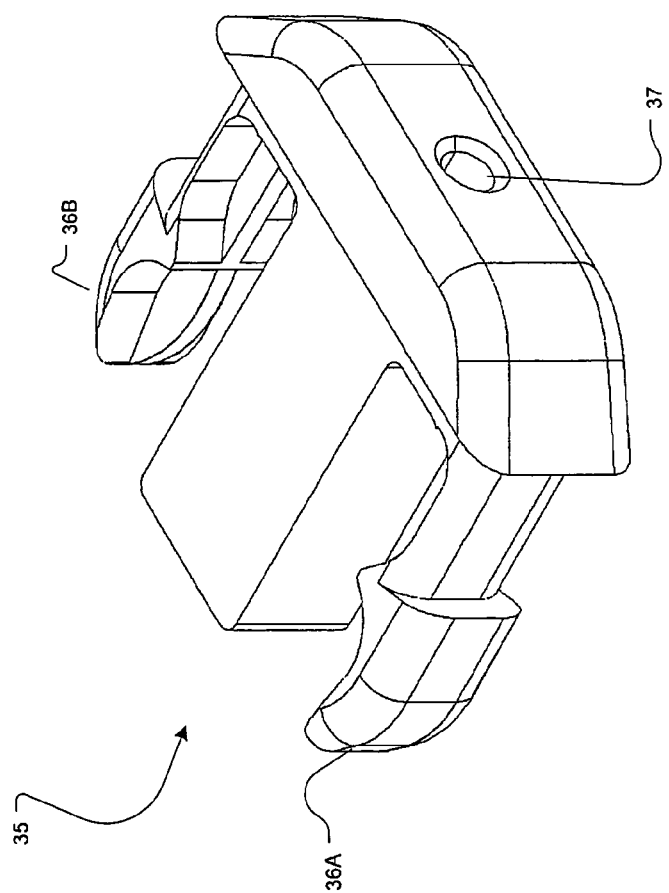
FIG. 10 is a perspective view of a male buckle in accordance with certain embodiments.
Figure 10A:
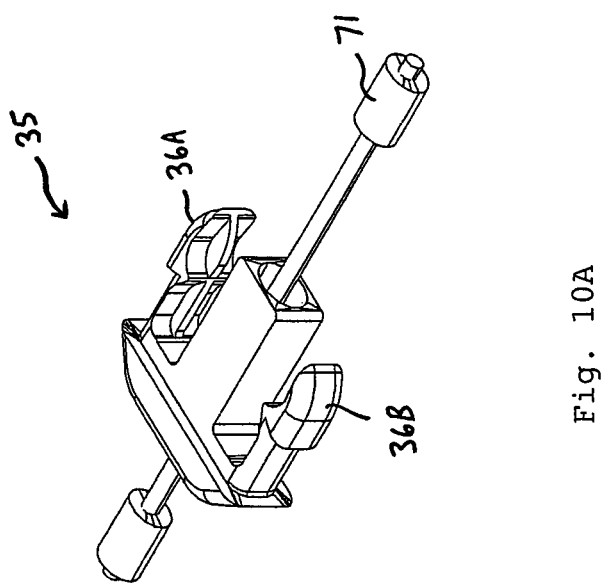
FIG. 10A is a perspective view of the male buckle of FIG. 10 with a cable shown therethrough.

The female buckle 30 includes a front slot 31 preferably extending the substantial width of the front face of the buckle, and opposite side apertures 32, 32A spaced inwardly from the front face of the buckle 30. The side apertures are shaped and position to receive respective flexible male prongs of a male buckle to cooperatively form a side release buckle assembly. Thus, as seen in FIG. 10, the male buckle 35 includes opposite prongs 36A, 36B, each of which can be flexed inwardly towards one another, enabling insertion into the front slot 31 of female buckle 30. Further insertion followed by release of the prongs causes the prongs to return to their unflexed state, thereby extending through slots 32A, 32B and locking the buckles together. To release the buckle, the portion of the prongs protruding through the slots are pushed inwardly while the male member is pulled out of the female buckle 30.

Figure 12:
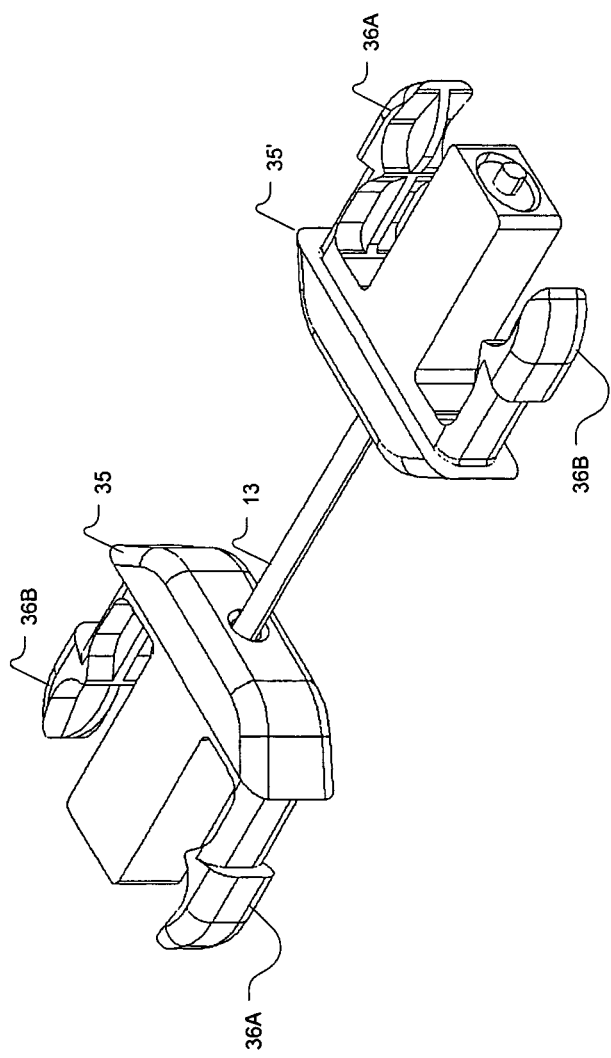
FIG. 12 is a perspective view of a panel jumper assembly in accordance with certain embodiments.

Certain male buckles 35 can have an aperture 37 in which cable 13 or 13' is inserted and secured within the buckle, such as by gluing. In certain embodiments, as shown in FIG. 12, such cable is attached at its other end to an identical, oppositely facing, male buckle 35', which secures to a different female buckle attached to a different panel, to secure the two panels together, creating a modular, scalable panel assembly. The length of the cable separating the two male buckles 35, 25' is chosen so that the distance between an end row or column of node holders on the first panel is appropriately spaced from an end row or column of node holders on the second panel. For example, the assembly of two male buckles with a cable therebetween, termed a panel jumper assembly 60, can be of a two inch length, a four inch length, or the two buckles 35, 35' can abut, depending upon the desired distance between rows or columns of nodes. Each end node holder can have such a slide buckle assembly or panel jumper assembly 60, to adequately secure the two panels together.

For example, turning back to FIG. 1, column A defines an end column of the left side panel, and column B is the end column of the right side panel. The two panels are secured together in a tiled assembly by side release buckle assemblies at each node holder 12 of column A. It will be readily appreciated by the skilled artisan that any number of columns and/or rows can make up a panel, including a single column or row, so that modular panel assemblies of any shape and size (e.g., any number of rows and columns) of node holders can be fabricated, simply by attaching rows and/or columns to each other using side buckle assemblies or other suitable attachment means.

Those skilled in the art will appreciate that the location of the male buckles and female buckles could be reversed (e.g., the male buckles could define an edge of a panel, and the panel jumpers could be female buckles).

The node holders 12 provide lightweight, preferably plastic surfaces to which strands of LED nodes can be simply attached or connected and detached or released. Such strands typically include an array of nodes, each node containing, for example, a red/green/blue tri-color LED and control chip, pre-mounted on flat flexible wire at a fixed spacing. Suitable strands are commercially available as iColor Flex strands available from Color Kinetics, and comprise a plurality of LED lights along three common conductor wires. Similar lighting elements are available from Lighting Science Group Corporation.

To assemble a panel, the following steps can be used:
1. Individual bottom pieces 14 of a pre-routed node holder 12 for cable are laid flat and in parallel vertical and horizontal rows.
2. Coated cable 13, 13' is then laid across the bottom portions 14 of the node holders 12. Each bottom portion 14 holds intersecting cable in place at 90 degree angles (FIG. 5).
3. A top portion 16 of the node holder 12 is placed above each bottom portion 14 and secured with adhesive or similar material, thereby securing the cables in place.
4. At the end of every horizontal row and vertical column of coated cable, a female side-release buckle 30 can be connected, finishing an edge of one panel. This female side-release buckle 30 sits across the top, bottom, and each side of the panel, creating the panel edges. Each panel is finished in the same manner, with female side-release edges.
5. Male panel jumpers, constructed of coated cable with a male buckle 35 on each, can be inserted into a female side-release buckle 30 of the panel, allowing one panel to modularly connect to another panel.

A guide can be used to appropriately position each bottom portion 14 of node holder 12 to ensure proper spacing and assembly. For example, a custom-rounded table can be used as a substrate to maintain accuracy of spacing and hold then node holder bottom portions 14 in place, such as by placing the bottom portions 14 in cuts in the guide at intersections where the node holder 12 will be. Cable is cut from a roll and laid into the guide with a small amount of adhesive at each node holder bottom portion 14. Once accuracy of the grid pattern created is verified and adhesive is applied per node holder bottom portions 14, the node holder top portions 16 are attached to respective bottom portions 14, enveloping cable intersections. At each cable intersection around the exterior of the panel where there is no node holder, a clip 22 is assembled around the cable with adhesive. The adhesive is allowed to cure, and node holders 12 are now suitable for mounting strands of lights thereto.

Figure 11:
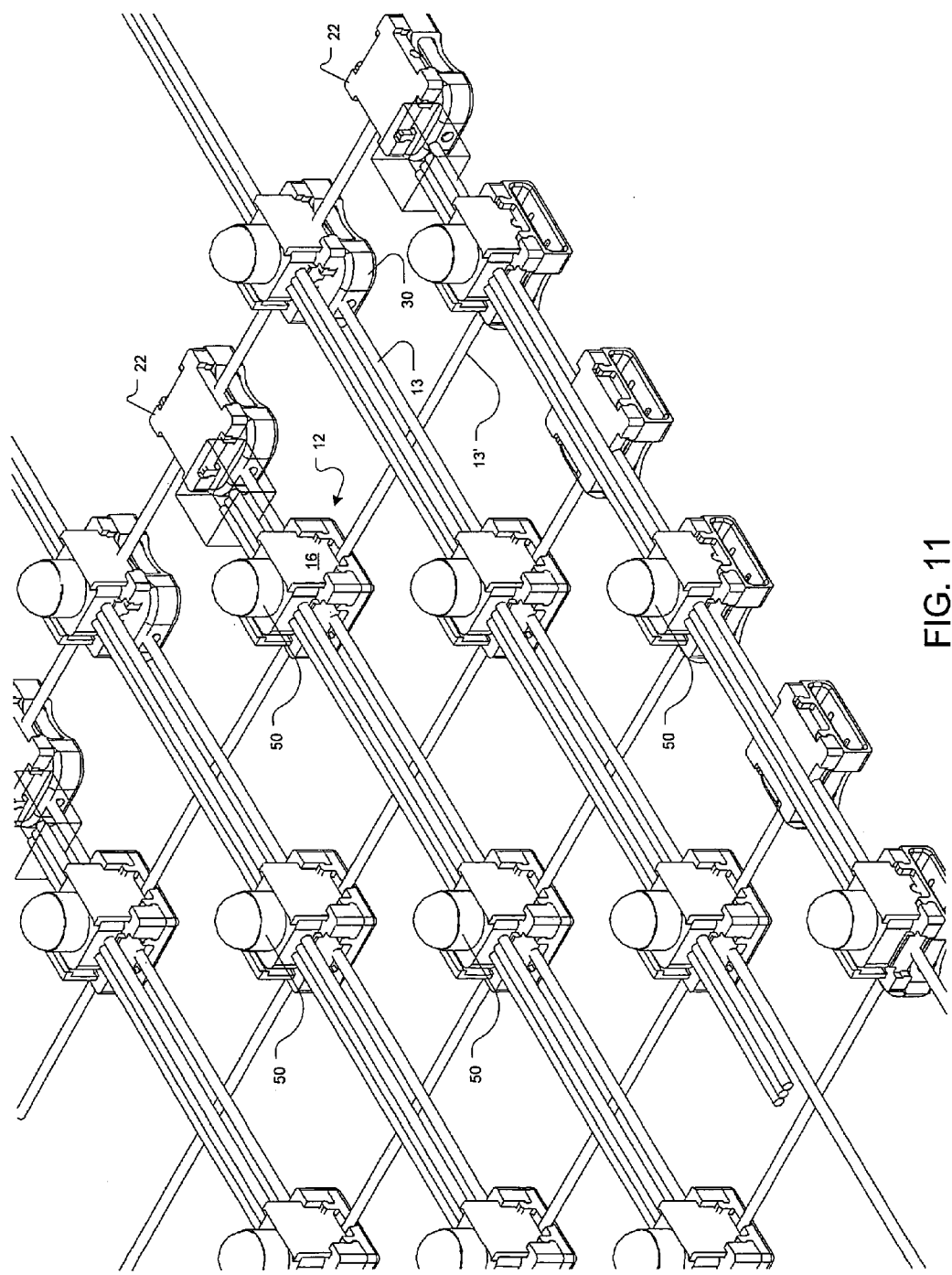
FIG. 11 is a perspective view of a portion of a panel holding LED nodes in accordance with certain embodiments.

FIG. 11 illustrates a portion of a panel with strands of nodes attached to the node holders 12. In certain embodiments, each strand includes a plurality of LED nodes 50 mounted in small plastic housings and arrayed in increments along a three-wire conductor, such as 16 or 18 AWG cable. Preferably the nodes are individually addressable to provide color flexibility, since each node can be called upon to generate virtually any color at any specified time. The strands are connected to a central wiring harness leading to existing power/data supply units to create a large-format modular lighting and/or video surface.

Because the nodes 50 are housed in node holders 12, undesirable twisting of the strands is eliminated. Furthermore, if a single or several LEDs on a strand malfunction, the strand can be easily replaced without having to replace other strands.

Those skilled in the art will appreciate that the panels are not limited to holding strands of nodes; individual lighting elements can be used, and the lighting elements can be Christmas lights, incandescent lights, LED's, etc.

Figure 13:
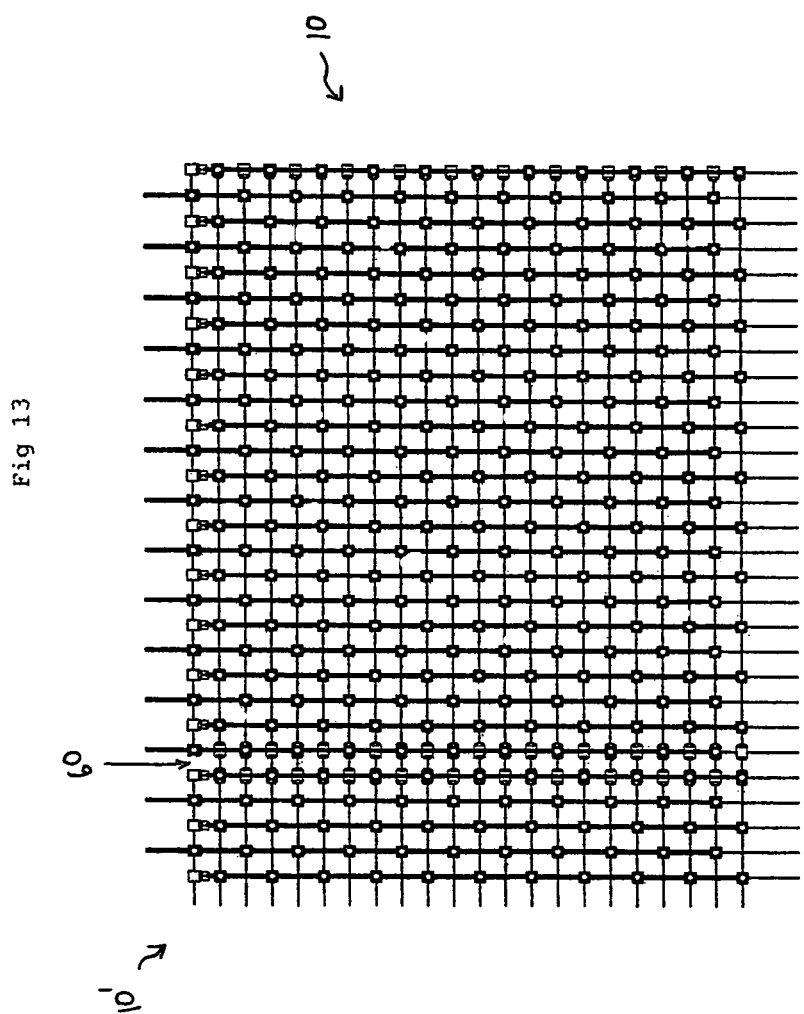
FIG. 13 is a top, view of two panels positioned for connection in accordance with certain embodiments.
Figure 14:
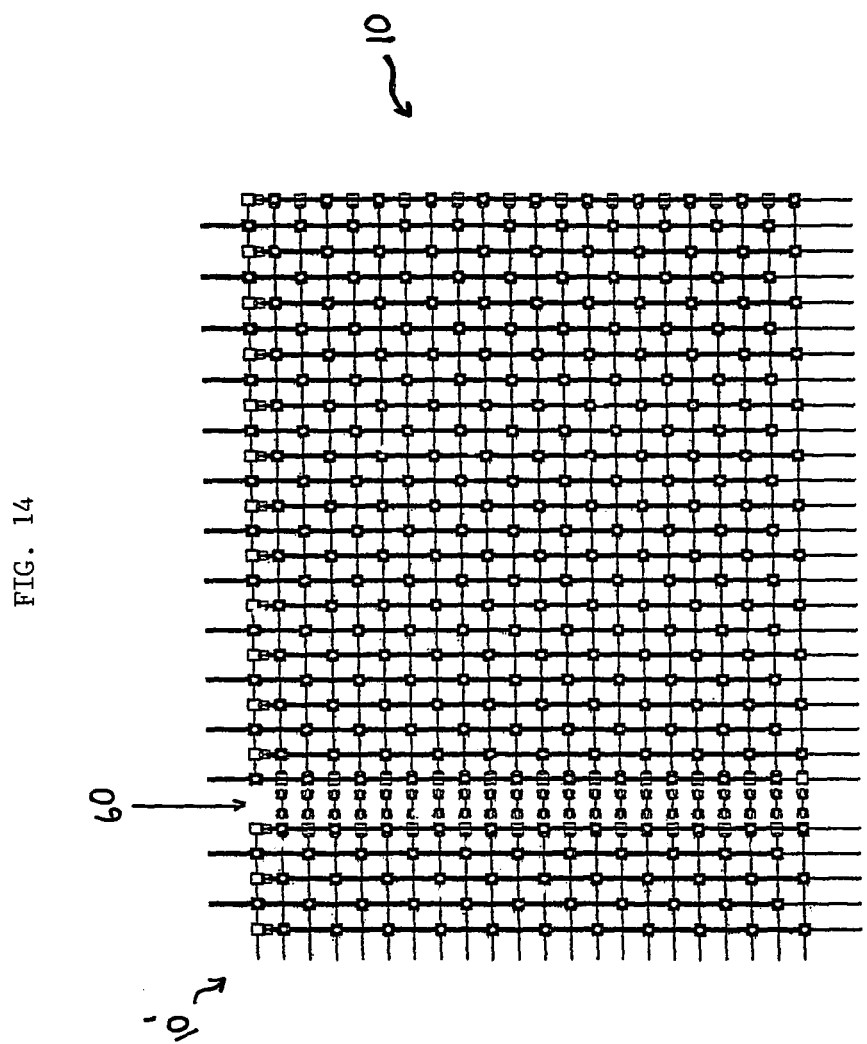
FIG. 14 is a top view of two panels connected in accordance with certain embodiments.

FIG. 13 illustrates two juxtaposed panels 10, 10', with panel jumper assemblies 60 positioned between them to join the panels together. The figure shows the edges of panel 10 comprises a plurality of female buckles 30 positioned to connect, if desired, to corresponding male buckles 35 to scale the panel. FIG. 14 illustrates the two panels 10, 10' joined by the panel jumper assemblies 60, each male buckle 35 of a panel jumper coupling to a female buckle 30 along one column of each panel 10, 10' edge.

Figure 15:
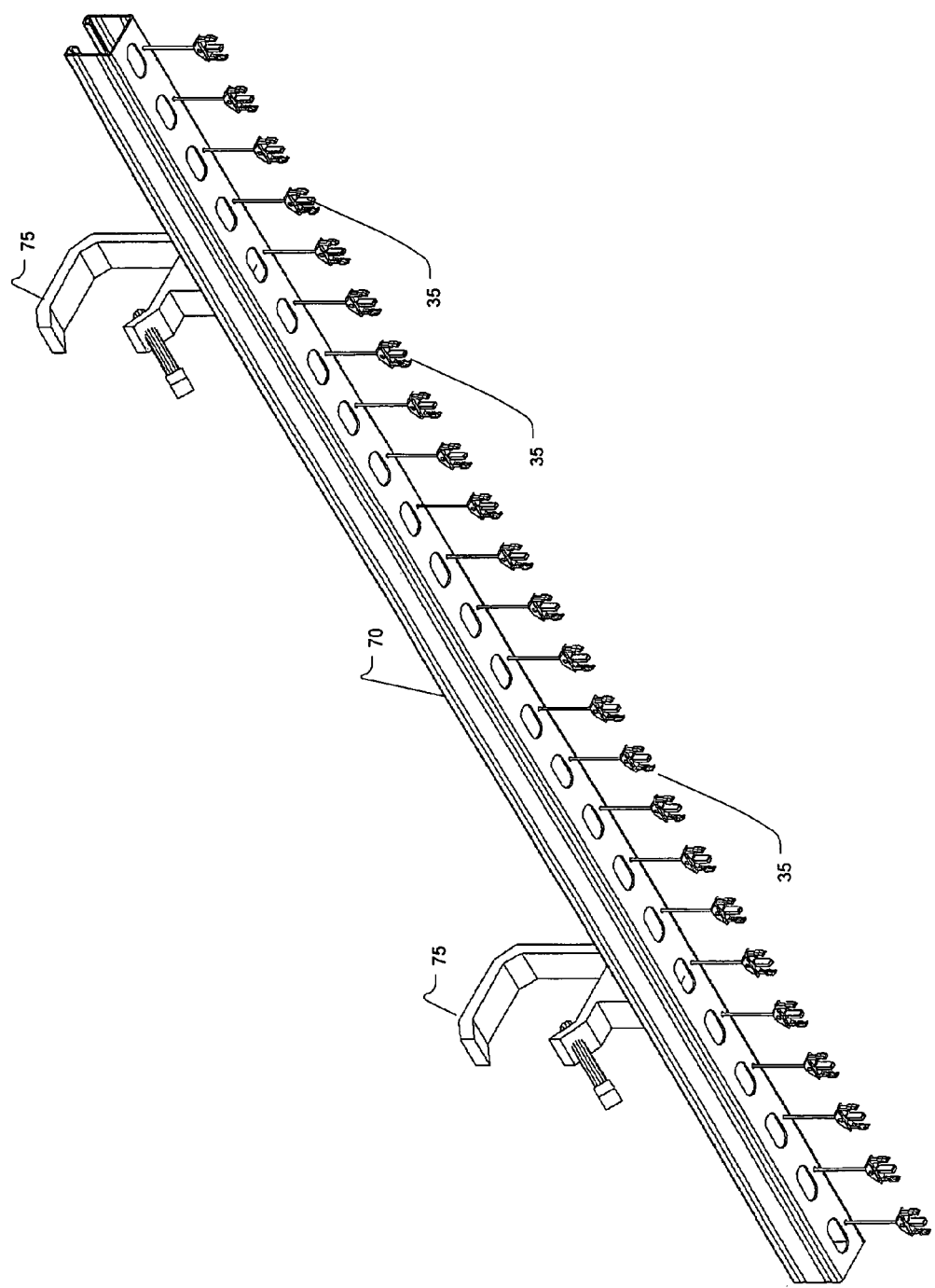
FIG. 15 is a perspective view of a bracket for attachment to a panel in accordance with certain embodiments.

In certain embodiments, the panel 10 can be mounted to one or more brackets 70 (FIG. 15) to assist in hanging, or to provide structure and rigidity to a tiled set of panels. Bracket 70, which can be fabricated of extruded metal, such as metal framing commercially available from Unistrut, includes a plurality of apertures through which the wiring for the light strands can pass, such as for connection to a power source. Extending from the bracket 70 via cable are male buckles 35, each positioned to engage a corresponding female buckle 30 of a panel edge to attach the panel 10 to the bracket 70. One or more standard theatrical C-clamps 75 or conduit brackets (J-hooks, conduit clamps, etc.) can be used to affix the bracket to a structure such as a truss or pipe.

Figure 16:
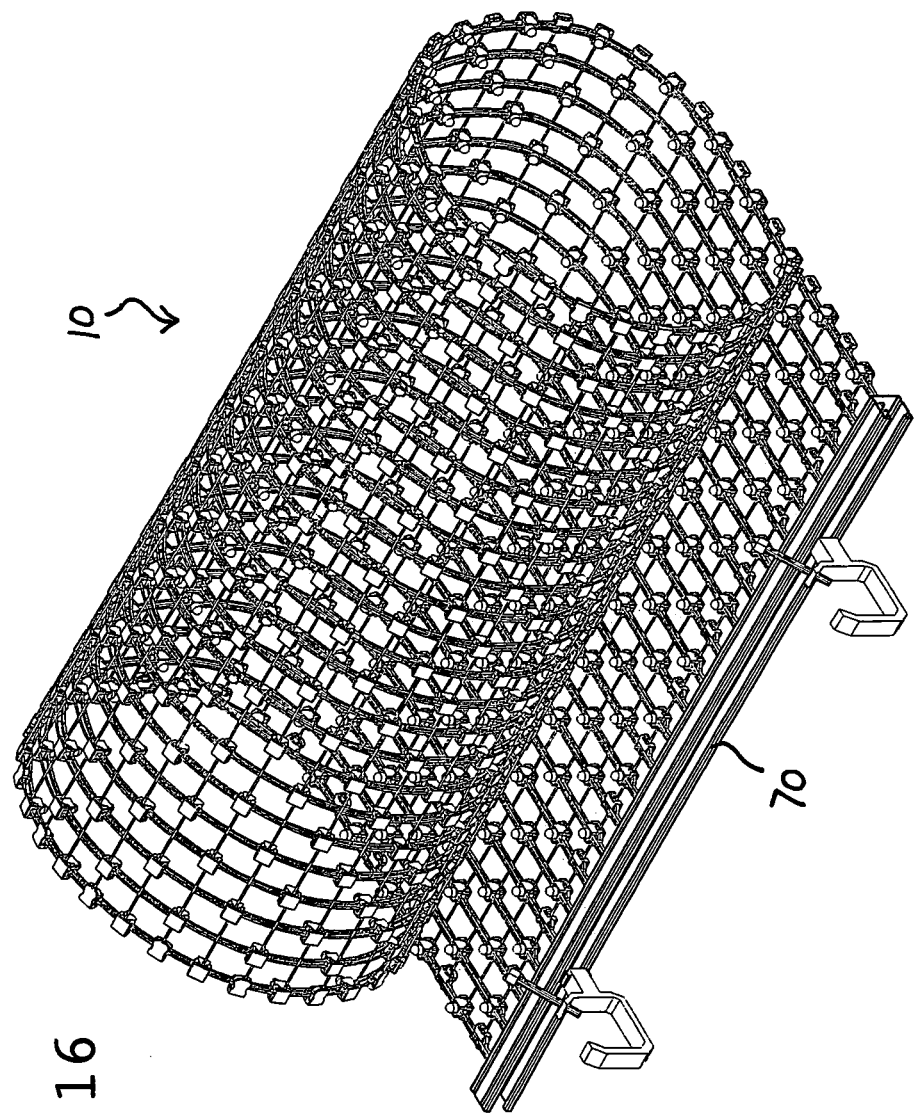
FIG. 16 is a perspective view of a panel in a rolled-up configuration.

In view of the flexibility of the panels 10, a panel 10 can be rolled-up upon itself for ease of handling, transport and storage, as illustrated in FIG. 16. In the embodiment shown, this result sin a cylindrical rolled-up body that is lightweight and can be easily transported manually. The rolled-up form can be comprised of a single panel, or a multiple panel modular assembly. To the extent a panel assembly has been scaled by combining multiple panels in the manner described, they can easily disassembled simply by disconnecting the buckles, which also can enhance the portability of the device.

Panels can be constructed in a variety of grid spacings to achieve scalability in resolution for content availability. The ability to tile panels together in vertical or horizontal fashions offer modularity and scalability to the end user. The absence of exposed metal creates a transparent, aesthetically pleasing panel, that lends itself to display on the side of a building or a glass background.

What is claimed is:

1. A panel assembly, comprising a plurality of node holders arranged in an array and connected to one another by flexible cable, said panel terminating in edges, wherein at least one of said edges is adapted to adjoin with an edge of a second panel assembly to form a multi-panel assembly; and a plurality of light strands, each of said strands comprising a plurality of spaced nodes connected by a wire conductor, wherein the spacing between said nodes corresponds to the spacing between said plurality of node holders such that each said node is releasably mounted to one of said plurality of node holders, and wherein each of said plurality of light strands is separately releasable from the node holders to which it is mounted so that said strand can be replaced on said panel assembly independently of the remainder of said plurality of strands, wherein said at least one edge comprises a plurality of either male or female buckles, each positioned to adjoin to a corresponding male or female buckle of a second panel assembly via a cooperating panel jumper assembly comprising a pair of spaced buckles.

2. The panel assembly of claim 1, wherein each said node comprises an LED.

3. The panel assembly of claim 1, wherein said plurality of node holders are interconnected to form linear arrays.

4. The panel assembly of claim 1, wherein said panel is in a rolled-up form.

5. A modular panel assembly, comprising a first panel assembly and a second panel assembly, each said panel assembly comprising a plurality of node holders arranged in an array and connected to one another by flexible cable, said first panel having a first panel edge comprising a plurality of first panel edge buckles, said second panel having a second panel edge comprising a plurality of second panel edge buckles, and wherein said first panel edge and said second panel edge are connected with a plurality of panel jumper assemblies each panel jumper assembly comprising a first panel jumper buckle joined to a first panel edge buckle and a second panel jumper buckle joined to a second panel edge buckle, to form said modular panel assembly; and a plurality of light strands, each of said strands comprising a plurality of spaced nodes connected by a wire conductor, wherein the spacing between said nodes corresponds to the spacing between said plurality of node holders such that each said node is releasably mounted to one of said plurality of node holders, and wherein each of said plurality of light strands is separately releasable from the node holders to which it is mounted so that said strand can be replaced on said panel assembly independently of the remainder of said plurality of strands.

6. The modular panel assembly of claim 5, wherein said plurality of node holders are interconnected to form linear arrays.

7. The panel assembly of claim 1, wherein each said node holder comprises a bottom portion having a groove, a top portion having a groove, and oppositely facing side walls defining between them an LED node receiving region, and wherein each said groove receives said flexible cable.

8. The panel assembly of claim 1, further comprising a bracket to which said panel assembly is mounted.

9. The modular panel assembly of claim 5, further comprising a bracket to which said first panel assembly is mounted.

\* \* \* \* \*